United States Patent
Arpaci (10) Patent No.: US 10,253,830 B2
(45) Date of Patent: Apr. 9, 2019

(54) BRAKE SHOE

(71) Applicant: SAF-HOLLAND GmbH, Bessenbach (DE)

(72) Inventor: Muhammet Arpaci, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/334,480

(22) Filed: Oct. 26, 2016

(65) Prior Publication Data

US 2017/0114844 A1    Apr. 27, 2017

(30) Foreign Application Priority Data

Oct. 26, 2015    (DE) .......................... 10 2015 118 233

(51) Int. Cl.

| F16D 65/08 | (2006.01) |
|---|---|
| F16D 51/28 | (2006.01) |
| F16D 65/22 | (2006.01) |
| F16D 51/22 | (2006.01) |
| F16D 65/02 | (2006.01) |
| F16D 125/30 | (2012.01) |

(52) U.S. Cl.
CPC ............. *F16D 65/08* (2013.01); *F16D 51/22* (2013.01); *F16D 51/28* (2013.01); *F16D 65/22* (2013.01); *F16D 2065/132* (2013.01); *F16D 2065/1344* (2013.01); *F16D 2125/30* (2013.01); *F16D 2250/0046* (2013.01); *F16D 2250/0076* (2013.01)

(58) Field of Classification Search
CPC .......... F16D 65/04; F16D 65/08; F16D 65/22; F16D 51/28
USPC .......................................... 188/250 B–250 D
See application file for complete search history.

(56) References Cited

U.S. PATENT DOCUMENTS

| 1,537,911 | A | * | 5/1925 | Wunschow | ........... F16D 65/062 |
| | | | | | 188/258 |
| 1,636,003 | A | | 7/1927 | Brie | |
| 1,652,485 | A | | 12/1927 | Brie | |
| 1,656,607 | A | * | 1/1928 | Pierce | ..................... F16D 65/08 |
| | | | | | 188/250 H |
| 1,794,348 | A | * | 2/1931 | Chase | ..................... F16D 65/08 |
| | | | | | 188/250 C |
| 1,865,823 | A | * | 7/1932 | Boegehold | ............. F16D 65/08 |
| | | | | | 188/250 A |
| 1,898,310 | A | | 2/1933 | Peterson | |
| 1,934,460 | A | * | 11/1933 | Whitworth | ............. F16D 65/04 |
| | | | | | 188/250 H |
| 1,937,997 | A | * | 12/1933 | Townsend | ............... F16D 65/08 |
| | | | | | 188/250 D |
| 1,957,635 | A | | 5/1934 | Evans | |
| 2,148,257 | A | | 8/1936 | Budd | |
| 2,852,106 | A | * | 9/1958 | Cull, Jr. | .................. F16D 65/22 |
| | | | | | 188/330 |

(Continued)

FOREIGN PATENT DOCUMENTS

| DE | 2148257 | 9/1971 |
| JP | H11270598 | 10/1999 |

*Primary Examiner* — Christopher P Schwartz
(74) *Attorney, Agent, or Firm* — Price Heneveld LLP (57) ABSTRACT

Brake shoe, in particular of a drum brake for utility vehicles, includes a lining plate and a bridge unit, wherein the bridge unit is formed as a one-piece body comprising at least two bridge plates.

26 Claims, 6 Drawing Sheets

(56) References Cited

U.S. PATENT DOCUMENTS

| | | | |
|---|---|---|---|
| 3,891,069 A * | 6/1975 | Lawrence | F16D 65/08 |
| | | | 188/250 G |
| 4,932,505 A * | 6/1990 | Epperly | F16D 65/22 |
| | | | 188/330 |
| 2002/0104720 A1* | 8/2002 | Borugian | F16D 51/20 |
| | | | 188/79.56 |
| 2007/0119668 A1 | 5/2007 | Webster et al. | |
| 2013/0199880 A1* | 8/2013 | Jancer | F16D 65/092 |
| | | | 188/250 B |
| 2014/0202804 A1* | 7/2014 | Wallmeier | F16D 65/08 |
| | | | 188/250 F |
| 2014/0202806 A1* | 7/2014 | Wallmeier | F16D 65/08 |
| | | | 188/261 |
| 2014/0246283 A1* | 9/2014 | Moss | F16D 65/08 |
| | | | 188/250 B |
| 2015/0167765 A1* | 6/2015 | Plantan | F16D 51/28 |
| | | | 188/332 |

\* cited by examiner

BRAKE SHOE

BACKGROUND OF THE INVENTION

The present invention relates to a brake shoe, in particular a drum brake for utility vehicles, a bridge unit for a brake shoe and a drum brake.

Drum brakes are still the preferred brake type in the utility vehicle segment and for trailers. Here, the basic structure comprises a rotating brake drum, against which two movably mounted brake shoes are pressed from the inside by an appropriate device, which produces the braking force. Known brake shoes normally comprise a number of parts which, for example, are joined together by welding and pressing: the lining plate, two webs, which are fixed to the lining plate at the rear, and corresponding mounting points or mounting shells which are used to mount the brake shoe. The outlay on fabrication and handling during the production of the brake shoes is correspondingly high. In addition, on account of the relatively high number of components, inaccuracies quickly arise during the joining, in particular as a consequence of the accumulating tolerances.

It is therefore an object of the present invention to specify a brake shoe, a bridge unit of a brake shoe and a drum brake which are quicker, simpler and still more accurate and more economic to produce.

SUMMARY OF THE PRESENT INVENTION

According to the invention, a brake shoe, in particular of a drum brake for utility vehicles, comprises a lining plate and a bridge unit, the bridge unit being formed as a one-piece body having at least two bridge plates. Typically, the drum brake comprises a brake drum, against which two movably mounted brake shoes, for example on a brake carrier or a brake anchor plate, are pressed from the inside by an appropriate device. The mounting of the brake shoe and the introduction of force take place via the bridge plates, which advantageously impart the necessary stiffness to the entire arrangement. Pressing on the brake shoes can be carried out directly mechanically via a camshaft, an expanding wedge or a wheel brake cylinder. In order to provide the actual braking action, an appropriate brake lining is arranged on the lining plate of the brake shoe, in particular riveted, for example. In the prior art, two mutually independent flanges or else webs are welded onto the rear side of the lining plate. These have to be positioned exactly relative to the lining plate and to each other since, as already mentioned, the mounting of the brake shoe and the introduction of force take place via the webs or bridge plates. Advantageously, the brake shoe now has the bridge unit, which is formed as a one-part or one-piece body comprising the at least two bridge plates. This configuration makes it possible to dispense with tolerances which would arise as a result of the assembly of the individual components. Since the bridge unit consists of one piece, the coordination during the mounting requires less outlay. Fabrication and mounting steps can therefore be dispensed with as compared with the prior art. The bridge unit can be fixed as a unit to the rear side of the lining plate with a form fit and/or force fit and/or an integral connection. It is preferably welded, for example. Advantageously, the bridge unit is formed from a homogeneous material.

According to one embodiment, the bridge unit is a deep-drawn part, for example, the bridge unit and the lining plate preferably being connected via the welded connection. The bridge unit can also be formed from a multiplicity of deep-drawn plates, preferably two, which are adhesively bonded and/or welded to each other. Thus, the bridge unit can have a sandwich-like structure. Alternatively, the bridge unit can also be produced by forging, bending, peening, hydroforming or pressing. The bridge unit can also be folded. Alternatively, the bridge unit can also be formed as a one-piece welded construction, which is then fixed to the lining plate as a unit. The term unit or the one-piece design is in particular to be understood to mean that the bridge unit is preferably (entirely) formed from a homogeneous structure or material. Depending on the embodiment, however, it is not ruled out that this structure is interrupted, by a welded seam, for example. Instead, what is important is that the bridge unit, when it is not arranged on the lining carrier, is a (single) component, comprising at least two bridge plates, which as a rule are connected either via a transverse plate or via a connecting plate.

According to one embodiment, the bridge unit has at least one connecting plate, which connects the two web surfaces. According to one embodiment, the connecting plate is oriented substantially parallel to the lining plate or replicates the orientation of the latter. Expediently, the connecting plate is arranged on an edge of the bridge plates that faces away from the lining plate. The maximum spacing of the connecting plate relative to a rear side of the lining plate in preferred embodiments is about 40-100 mm, preferably about 50-90 mm. Here, the spacing is highest in the central region of the lining carrier, since here the highest forces have to be absorbed. Expediently, the spacing of the connecting plate from the rear side of the lining carrier is highest in the center of the brake shoe and falls off on both sides along the bridge unit, that is to say along a circumferential direction of the brake drum. Therefore, a reduction in weight can advantageously be achieved. The aforementioned spacing corresponds substantially to the height of the bridge plates, which will be explained further below. The connecting plate or the connecting plates extend/s substantially along the circumferential direction. Transversely thereto, the bridge unit according to one embodiment is connected by at least one transverse plate which, so to speak, constitutes one end of the bridge unit in the circumferential direction. According to one embodiment, the bridge unit is therefore entirely closed. Bridge plates and transverse plates form a circumferential arrangement surface, via which the arrangement on the rear side of the lining plate, that is to say the side facing away from the friction lining, is carried out. This closed structure is extremely stiff and can accordingly be implemented with thin walls and light weight. In principle, it should be mentioned at this point that the material of the bridge unit and also for the lining plate is preferably a steel material. A wall thickness of the bridge unit in preferred exemplary embodiments is around 1-8 mm, particularly preferably around 2-6 mm.

According to one embodiment, the connecting plate has at least one opening or a recess or forms the same. This likewise permits a further reduction in weight and can in addition be used for dissipation of heat from the bridge unit formed in one piece. The opening can be formed as a hole, in particular as a round or circular hole. However, also preferred is an elongated opening, which extends along the circumferential direction, at least in some sections. The width of the opening is dimensioned in such a way that parts of the connecting web still remain. This permits a high stiffness and low use of material, especially in the longitudinal direction/circumferential direction. According to one embodiment, a ratio of a width of the connecting plate to a width of the opening lies in a range from about 0.1-0.9, preferably around 0.2-0.8. The connecting plate in general advantageously permits an increase in the stiffness of the bridge unit and improved dissipation of heat and also heat distribution. Thus, heat differences and temperature peaks from one bridge plate to the other can easily be compensated for via the connecting plate. Via the arrangements of openings/recesses in the connecting plate or connecting plates or possibly also in the bridge plates themselves, the temperature distribution can be adapted individually. Particularly expediently, by means of two openings (for example round opening and slot) located adjacent to each other in the connecting plate, a web area is formed which forms an engagement area for a return spring to be hooked in.

According to one embodiment, the bridge plates extend substantially in the form of a curve, in particular convexly, with reference to a mid-plane of the lining plate. The mid-plane is that plane which extends centrally and at right angles to the lining plate, along the longitudinal direction of the latter or along the circumferential direction. As a rule, the mid-plane is also the plane of symmetry. The curved form can be seen in particular in a plan view of the rear side of the brake shoe. Expediently, the width of the bridge unit in the center is therefore greater than at its respective ends. Expediently, a ratio of a minimum width to a maximum width lies around 0.05-0.8, preferably around 0.08-0.7. This configuration permits an optimal strength and stiffness of the brake shoe with minimal use of material. In addition, as a result of the course of the bridge plates on the rear side of the lining plate, the dissipation of heat from the lining plate is effected in the best way possible. According to one embodiment, the bridge plates also extend rectilinearly in plan view but are nevertheless aligned in such a way that they extend obliquely with reference to the mid-plane. Starting from the respective ends of the bridge unit, the bridge plates therefore describe an angle toward the center which, for example, lies in a range from about 2°-30°, preferably about 4°-25° and particularly preferably 10°-20°. Expediently, the bridge unit is designed to be symmetrical, in particular axially symmetrical, with reference to the mid-plane.

According to one embodiment, the bridge plates are also inclined with respect to a mid-plane of the lining plate. In combination with the connecting plate, the result is therefore expediently a trapezoidal shape, a geometry which counteracts the forces that arise extremely well. An angle of the bridge plate (measured on the outside of the bridge unit) measured relative to the rear side of the lining plate according to one embodiment lies, for example, in a range from about 90°-130°, preferably at about 92°-105°. In particular, at their sides or edges facing the lining plate, the bridge plates can be spaced further apart from each other than at their sides or edges facing away from the lining plate.

According to one embodiment, the bridge unit is designed in such a way that a stiffness of the bridge unit increases toward the center of the brake shoe. Here, toward the center means in particular toward the center "as seen in the circumferential direction". Thus, for example, the height of the bridge plates in the central region is greater than toward the corresponding end regions, where the brake shoe is mounted or where the introduction of force takes place. The decrease in height can take place continuously or also in a stepped manner or in steps. Expediently, the minimum height of the bridge plates, which is measured in the region of the functional areas at the edge, in relation to a maximum height of the bridge plates in the center lies in a range from 0.2 to 0.8, preferably in a range from 0.3-0.7. Here, the height of the bridge plates is measured at right angles to the lining carrier. Incidentally, this also applies to the spacing of the connecting plate or plates.

According to one embodiment, the brake shoe comprises two bridge units, which are connected to each other along a dividing plane, in particular welded. The dividing plane extends here substantially transversely with respect to a longitudinal direction or circumferential direction of the brake drum and the brake shoe. In particular, the dividing plane is substantially also transverse with respect to the mid-plane (however, an angle not equal to 90° is also possible). Such a configuration can be advantageous in particular with regard to the fabrication of the bridge unit, since further possibilities therefore result, such as for example folding or pressing/bending/peening from one piece of sheet metal.

According to one embodiment, the bridge unit forms at least one functional area, in particular a bearing section, which in particular is formed spherically or cylindrically. In addition, a functional area can be also a force introduction area. In the prior art, the force introduction area is configured, for example, via a cam roller which is (rotatably) fixed to the webs. Advantageously, just this function is provided directly by the bridge unit as a result of the cylindrical configuration of the functional area. The mounting of the brake shoe in the prior art is carried out, for example, via a ball, which is fixed to the webs via a corresponding bearing shell/spherical shell. Advantageously, this function is provided directly by the spherical configuration of the functional area. In principle, the explicit shaping of the functional area—spherical, ball-shape, cylindrical or possibly also another geometry—is not critical. What is important is that the bridge unit itself forms this geometry or shape; this is therefore also formed by deep-drawing, forging, bending, peening, hydroforming, pressing, etc. Here, the two functional areas can be formed identically or else differently. The functional area is therefore preferably shaped together with the bridge unit and advantageously forms one unit with the latter. Alternatively, the bearing section can also be fixed to the bridge unit as a separate component by a form fit and/or force fit or integral fit or, for example, welded on.

According to one embodiment, a needle bearing is arranged or provided on the functional area or bearing section. According to one embodiment, the needle bearing has a corresponding bearing cage in order to be able to be positioned with respect to the bridge unit and to match the course of a cam contour. The bearing cage is in turn expediently rotatably fixed or arranged on the functional area of the bridge unit.

The invention also otherwise relates to a bridge unit which has the aforementioned advantages and features. In particular, a bridge unit which is formed as a one-piece body comprising at least two bridge plates is claimed. Expediently, the bridge unit also comprises at least one functional area, which is likewise part of the aforementioned one-piece body.

The invention also relates to a drum brake comprising at least one brake shoe as claimed in one of the preceding claims, and to a cam element for actuating the at least one brake shoe, a friction-reducing layer being provided on a contact surface of the cam element. This layer can, for example, be made of an abrasion-resistant plastics material, a wear-resistant sliding lacquer or a Teflon coating. The friction-reducing layer is in particular matched to the (steel) material used for the bridge unit, since the bridge unit definitely preferably also forms the functional area directly, e.g. the bearing section and/or the force introduction area.

BRIEF DESCRIPTION OF THE DRAWINGS

Further advantages and features can be gathered from the following description of preferred embodiments of the brake shoe according to the invention and of the drum brake according to the invention, with reference to the appended figures. Here, individual features of the individual embodiments can be combined with one another within the scope of the invention.

DETAILED DESCRIPTION OF THE PREFERRED EMBODIMENTS

Figure 1:
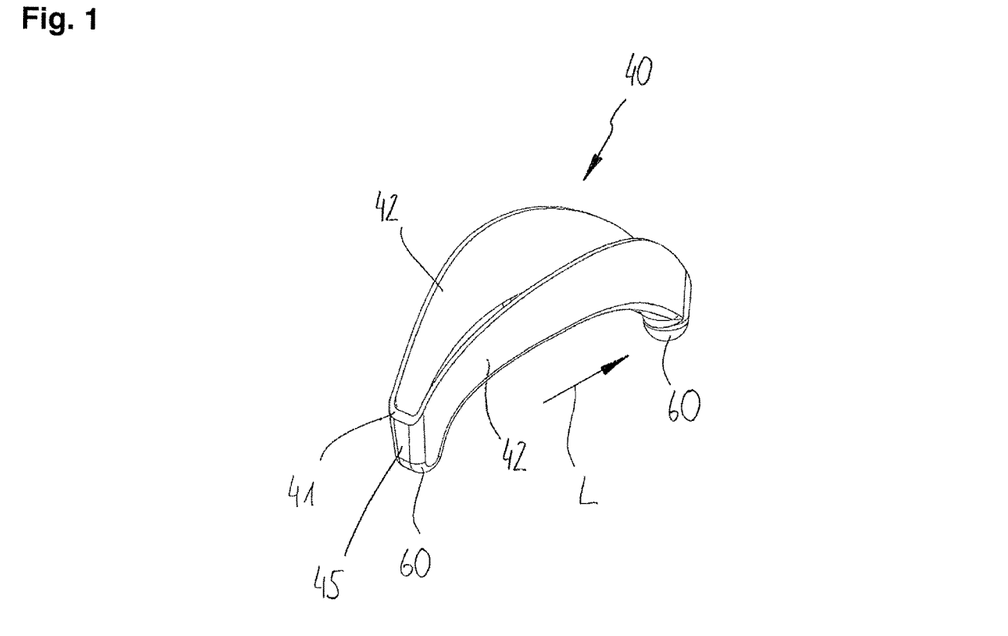
FIG. 1 shows an embodiment of a bridge unit in a perspective illustration.

FIG. 1 shows in a perspective illustration a bridge unit 40 comprising two bridge plates 42, which are connected via transverse plates 45. The bridge unit 40 extends along a longitudinal direction L (or along a circumferential direction of the brake drum) and, at its respective ends, respectively forms functional areas 60, the (rear) one being formed spherically, in particular in the shape of a ball, the front one more likely cylindrically. It is possible to see clearly the one-piece configuration on the bridge unit 40, comprising the two bridge plates 42, the transverse plates 45 and the functional areas 60. The bridge unit 40 forms a circumferential arrangement surface 41, via which the arrangement and fixing on a brake lining, not illustrated here, is carried out, for example via a welded connection. Here, the great advantage of the bridge unit 40 becomes clear, specifically that only one component has to be "handled". In addition, the decreasing height of the bridge plates 42 toward the functional areas 60 is shown clearly. The height of the bridge plates 42 is therefore greatest in the center of the bridge unit 40 and decreases steadily or continuously toward the ends.

Figure 2:
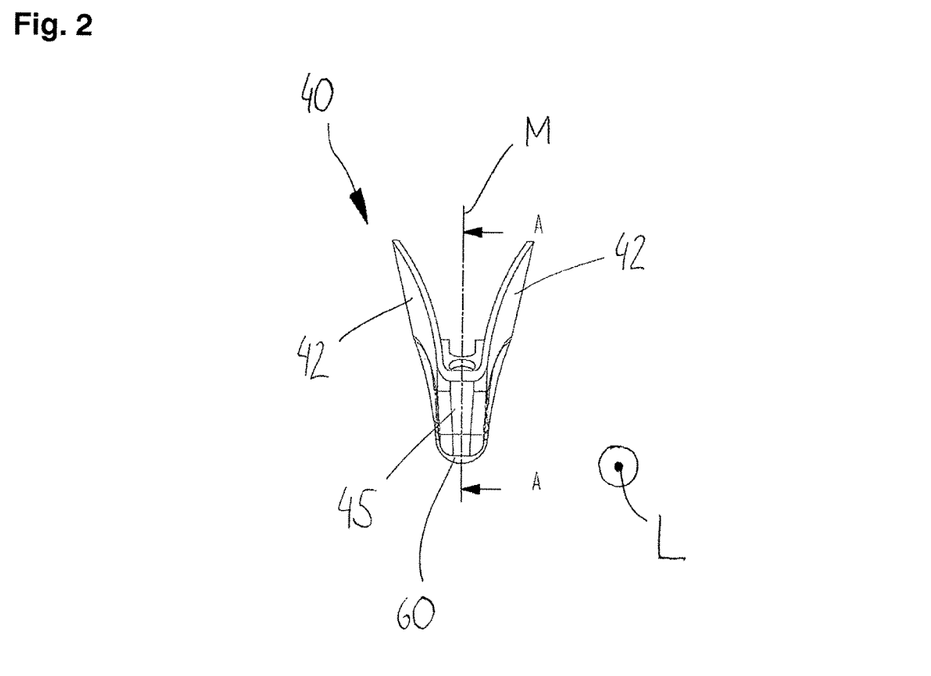
FIG. 2 shows the bridge unit known from FIG. 1, viewed along a longitudinal direction/circumferential direction.

FIG. 2 shows the bridge unit 40 known from FIG. 1, viewed along the longitudinal direction L or in the circumferential direction. It is possible to see the substantially symmetrical or axially symmetrical configuration of the bridge unit 40 with reference to a mid-plane M. In particular, in the view illustrated here, the connection of the two bridge plates 42 via the transverse plate 45 is illustrated. The functional area 60 extends away downward from the transverse plate 45. The sketched section A-A is illustrated in FIG. 3.

Figure 3:
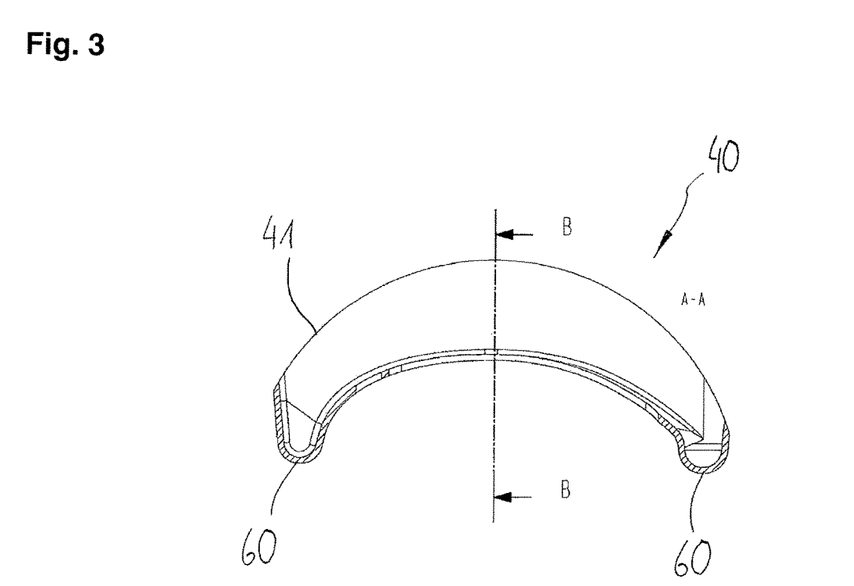
FIG. 3 shows the section A-A as sketched in FIG. 2.

FIG. 3 shows the section A-A as sketched in FIG. 2. It is possible to see in particular the course of the arrangement surface 41 and the lateral contour of the two functional areas 60. It can also be seen that a height of the bridge unit 40 decreases toward its ends. The sketched section B-B is illustrated in FIG. 4.

Figure 4:
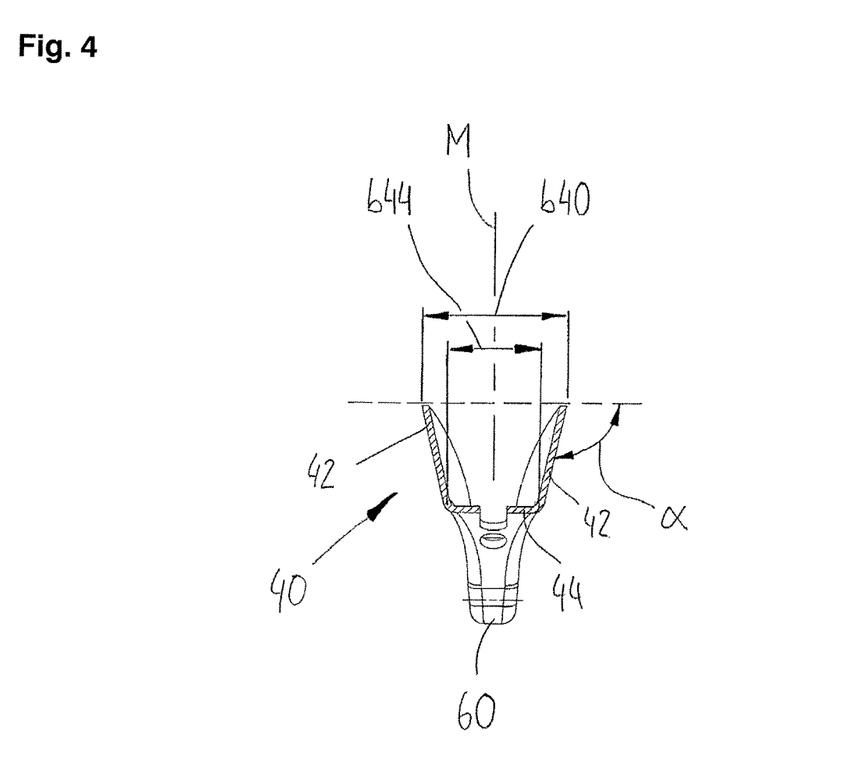
FIG. 4 shows the section B-B as sketched in FIG. 3.

FIG. 4 shows in particular the substantially trapezoidal configuration of the cross section of the bridge unit 40. In particular, the trapezoidal shape results from the position and orientation of the bridge plates 42 relative to the connecting plate 44. Thus, a width b40 of the bridge unit and a width b44 of the connecting plate 44 result, an advantageous ratio here lying in a range from about 1.0 to 2.0, preferably 1.3 to 1.7. Indicated dashed is the orientation of a lining plate. Between the lining plate and the bridge plate 42 there is an angle α which, in preferred embodiments, for example, lies in a range from about 90° to 130°, preferably 92° to 105°.

Figure 5:
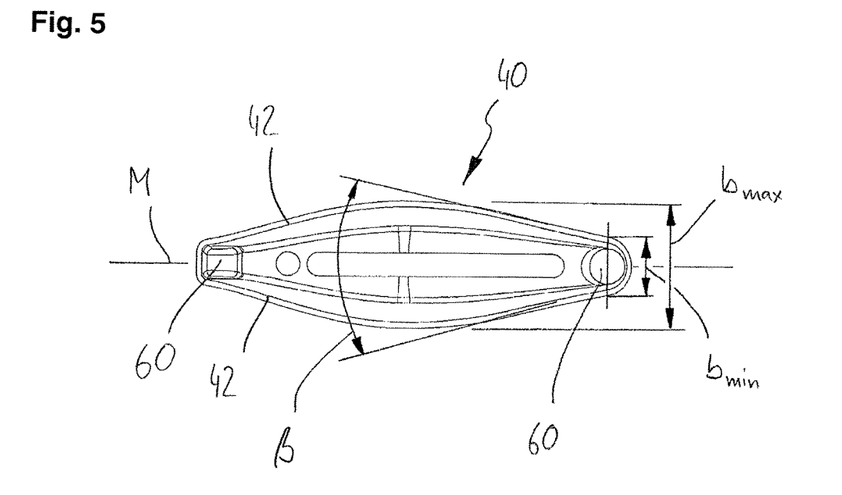
FIG. 5 shows a plan view of the bridge unit known from FIG. 1.

FIG. 5 shows the bridge unit to be seen in FIG. 3 folded downward. Here, in particular the course of the bridge plates 42, which can substantially be designated as convex, becomes clear. In this case, the bridge plates 42 enclose an angle β which, for example, lies in a range from about 2° to 30°, preferably 4° to 25° or 10° to 20°. The width ratios of the bridge unit 40 also become clear, a maximum width $b_{max}$ in a central region of the bridge unit lying at about 100 mm to 120 mm, while a minimum width $b_{min}$ lies in a range from about 40 mm to 50 mm. The minimum width is measured approximately in the area of the functional areas 60.

Figure 6:
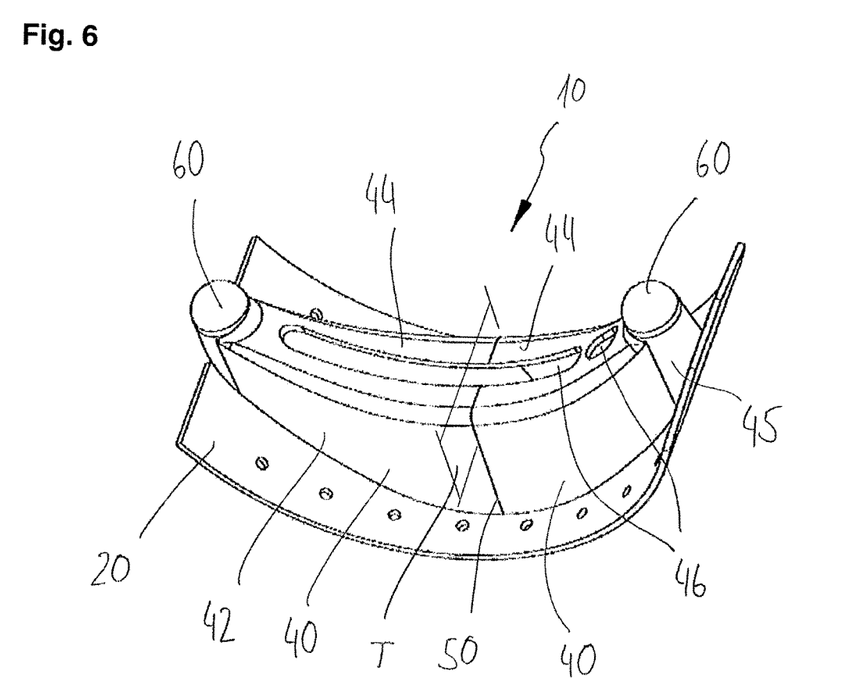
FIG. 6 shows a perspective illustration of an embodiment of a brake shoe.

FIG. 6 shows a brake shoe 10, comprising a lining plate 20, to which two bridge units 40 are fixed via a welded connection. The two bridge units 40 are welded to each other along a welded connection 50 along a dividing plane T. The bridge units 40 comprise lateral bridge plates 42 and transverse plates 45. Moreover, the bridge plates 42 are connected by connecting plates 44, which extend in relation to the lining plate 20 in such a way that the connecting plates 44 have a greater radius of curvature than the lining plate 20. The connecting plate 44 forms an elongated opening 46. The bridge units 40 each comprise a functional area 60, both being formed spherically or in a ball shape here.

Figure 7:
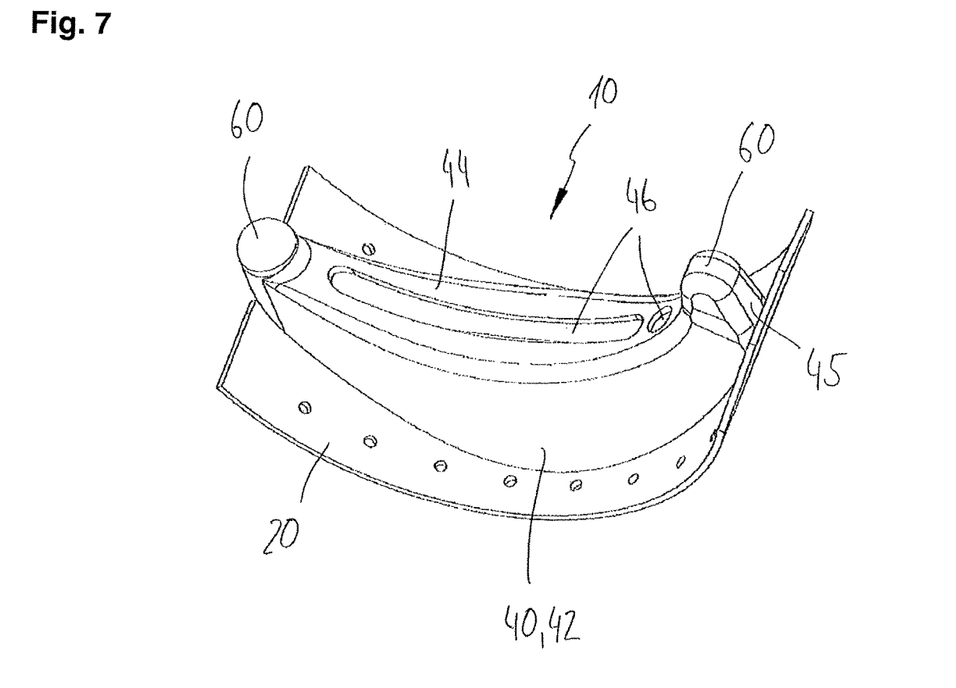
FIG. 7 shows a further perspective illustration of an embodiment of a brake shoe.

FIG. 7 shows a similar configuration of a brake shoe 10 as known from FIG. 6. The difference here resides in the fact that here only one bridge unit 40 is provided. Moreover, a right-hand functional area 60 is formed cylindrically here.

Figure 8:
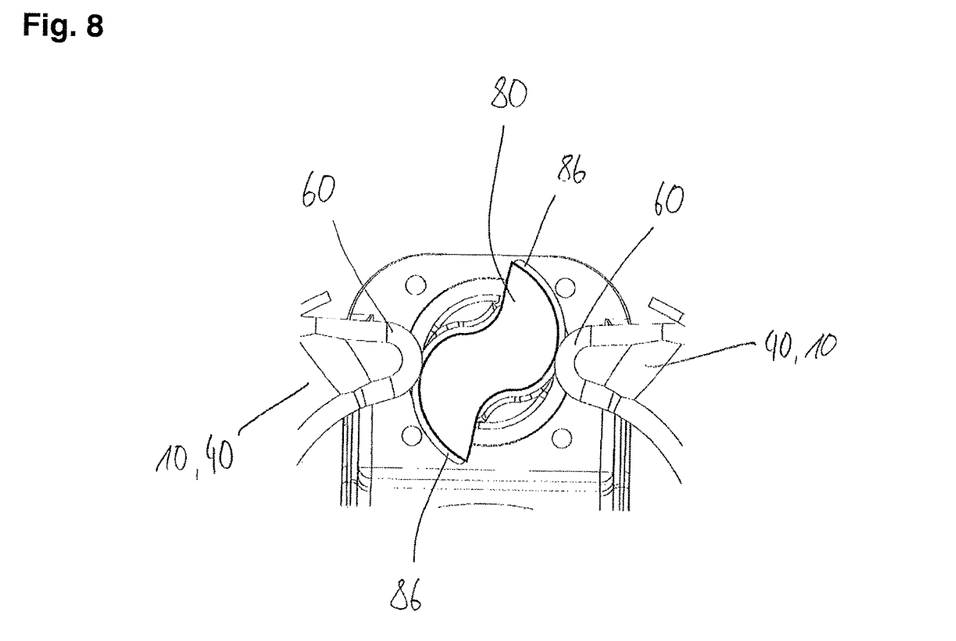
FIG. 8 shows an embodiment of a cam element.

FIG. 8 shows a cam element 80 which is used to actuate two brake shoes 10, which are illustrated only in part here. The introduction of force is carried out onto the corresponding functional areas 60 of the brake shoes 10 and the bridge unit 40. A friction-reducing layer 86, which is arranged on the cam element 80 and which improves the frictional behavior between the cam element 80 and the functional areas 60, is indicated.

Figure 9:
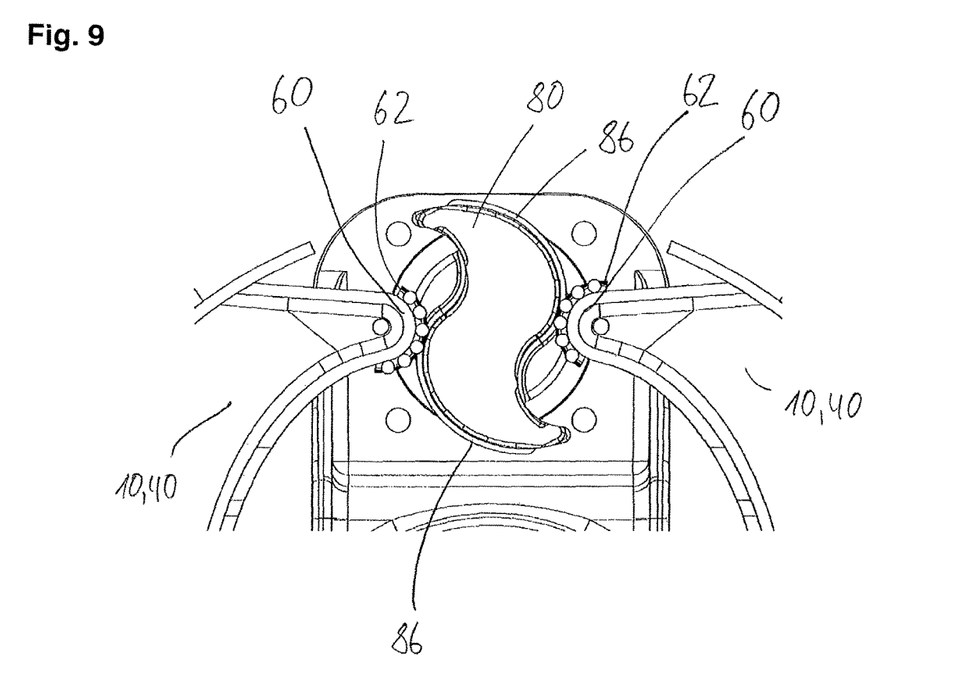
FIG. 9 shows a further embodiment of a cam element, the brake shoe being provided with needle bearings.

FIG. 9 substantially shows the configuration known from FIG. 8, here a needle bearing 62 being arranged on a functional area 60 of a brake shoe 10. Here, too, the cam element 80 is provided with a friction-reducing layer 86.

Figure 10:
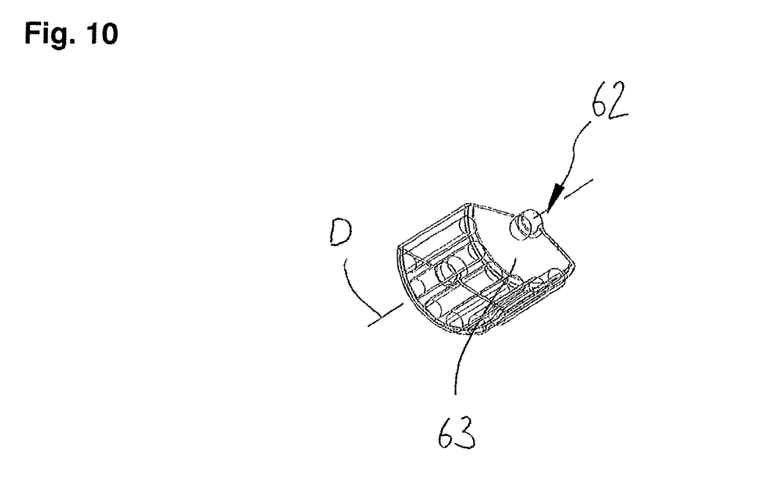
FIG. 10 shows an embodiment of a needle bearing.

FIG. 10 shows the needle bearing 62 in a detailed illustration. Here it is possible to see in particular a bearing cage 63, which can be rotatably fixed to a functional area 60 of the bridge unit 40. Indicated here is a corresponding axis of rotation D, via which ultimately the (rotatable) arrangement on the corresponding functional area of the bridge unit is carried out.

Figure 11:
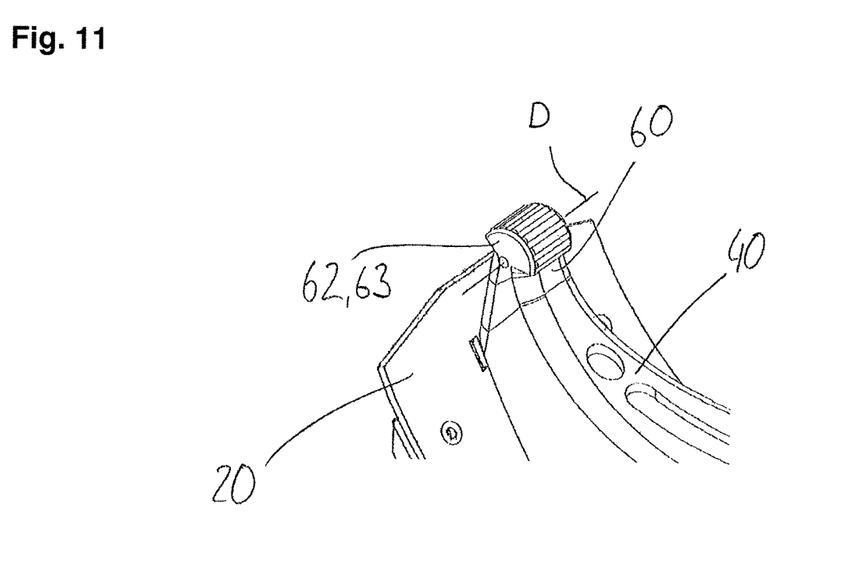
FIG. 11 shows an embodiment of a bridge unit with a needle bearing arranged thereon.

FIG. 11 shows the arrangement of a needle bearing 62 with its bearing cage 63 on a bridge unit 40 and the functional area 60 of the latter. Appropriate mobility about an axis of rotation D is provided.

LIST OF DESIGNATIONS

10 Brake shoe
20 Lining plate

40 Bridge unit
b40 Width of the bridge unit
$b_{min}$ Minimum width (of the bridge unit)
$b_{max}$ Maximum width (of the bridge unit)
41 Arrangement surface
42 Bridge plates
44 Connecting plate
45 Transverse plate
46 Opening
50 Welded seam
60 Functional area, bearing section, force introduction area
62 Needle bearing
64 Bearing cage
80 Cam element
86 Friction-reducing layer
M Mid-plane
T Dividing plane
L Longitudinal direction
D Axis of rotation
$\alpha, \beta$ Angle

The invention claimed is:

1. A brake shoe for utility vehicles, comprising:
a lining plate; and
a bridge unit;
wherein the bridge unit is a one-piece body comprising at least two bridge plates; and
wherein a stiffness of the bridge unit increases towards a center of the brake shoe when viewed in a circumferential direction.

2. The brake shoe as claimed in claim 1, wherein the bridge unit is a deep-drawn part, and wherein the bridge unit and the lining plate are connected via a welded connection.

3. The brake shoe as claimed in claim 2, wherein the bridge unit has a connecting plate which connects the two bridge plates.

4. The brake shoe as claimed in claim 3, wherein the connecting plate has at least one opening.

5. The brake shoe as claimed in claim 4, wherein the bridge plates extend substantially in the form of a curve with reference to a mid-plane of the lining plate.

6. The brake shoe as claimed in claim 5, wherein the bridge plates extend in a convex curve.

7. The brake shoe as claimed in claim 5, wherein the bridge plates are inclined toward a mid-plane of the lining plate.

8. The brake shoe as claimed in claim 1, wherein the bridge plates extend substantially in the form of a curve with reference to a mid-plane of the lining plate.

9. The brake shoe as claimed in claim 8, wherein the bridge plates extend in a convex curve.

10. The brake shoe as claimed in claim 1, wherein the bridge plates are inclined toward a mid-plane of the lining plate.

11. The brake shoe as claimed in claim 1, wherein the bridge unit includes at least one bearing section.

12. The brake shoe as claimed in claim 1, wherein a needle bearing is arranged on the functional area.

13. A drum brake, comprising:
at least one brake shoe as claimed in claim 1; and
a cam element configured to actuate the at least one brake shoe;
wherein a contact surface of the cam element has a friction-reducing layer.

14. The brake shoe as claimed in claim 1, wherein the bridge unit comprises a trapezoidal shape in cross section.

15. A brake shoe for utility vehicles, comprising:
a lining plate; and
a bridge unit;
wherein the bridge unit is a one-piece body comprising at least two bridge plates;
wherein the bridge plates are inclined toward a mid-plane of the lining plate; and
wherein the bridge unit comprises a pair of bridge plates, and wherein sides of the pair of bridge plates facing the lining plate are spaced further apart from each other than sides of the pair of bridge plates facing away from the lining plate.

16. The brake shoe as claimed in claim 15, comprising two bridge units which are connected to each other along a dividing plane.

17. The brake shoe as claimed in claim 16, wherein the bridge unit includes at least one bearing section.

18. The brake shoe as claimed in claim 17, wherein a needle bearing is arranged on the functional area.

19. The brake shoe as claimed in claim 16, wherein the two bridge units are welded to each other along the dividing plane.

20. The brake shoe as claimed in claim 15, wherein a stiffness of the bridge unit increases towards a center of the brake shoe.

21. A brake shoe for utility vehicles, comprising:
a lining plate; and
a bridge unit;
wherein the bridge unit is a one-piece body comprising at least two bridge plates;
wherein the bridge unit includes at least one bearing section; and
wherein the bearing section is configured for the arrangement of a needle bearing.

22. The brake shoe as defined in claim 21, wherein the bearing section is at least one of spherical and cylindrical.

23. A bridge unit of a brake shoe for drum brakes for utility vehicles, which is formed as a one-piece body and has two bridge plates, wherein a stiffness of the bridge unit increases toward a center of the brake shoe when viewed in a circumferential direction.

24. The bridge unit as claimed in claim 23, further comprising:
a functional area which is part of the one-piece body.

25. A bridge unit of a brake shoe for drum brakes for utility vehicles, which is formed as a one-piece body and has two bridge plates, wherein the bridge plates are inclined toward a mid-plane of the lining plate, and a pair of bridge plates, and wherein sides of the pair of bridge plates facing the lining plate are spaced further apart from each other than sides of the pair of bridge plates facing away from the lining plate.

26. A brake shoe for utility vehicles, comprising:
a lining plate; and
a bridge unit having end regions;
wherein the bridge unit is a one-piece body comprising at least two bridge plates; and
wherein a stiffness of the bridge unit increases towards a center of the brake shoe located between the end regions.

* * * * *